Patented June 19, 1951

2,557,283

UNITED STATES PATENT OFFICE 2,557,283

COMPOSITION FOR THE BAKING OF BREAD

Francis Frederick Hansen, Pittsburgh, Pa.

No Drawing. Application July 28, 1945,
Serial No. 607,673

3 Claims. (Cl. 99—91)

This invention relates to the art of baking bread, and other products in connection with which yeast is used, and the term "bread" as herein used is intended to cover any baked food product made with yeast.

More especially, my invention involves the preparation of calcium acid lactate for use in the baking industry, and its method of use in the baking of bread. In my co-pending application Serial No. 599,119, filed June 12, 1945, there is disclosed a composition for and method of baking bread wherein calcium acid lactate is an active ingredient, and in which calcium acid lactate is employed in conjunction with calcium lacto phosphate.

Calcium acid lactate is normally highly hygroscopic, and for this reason its use in the baking industry is difficult. In accordance with the present invention there is provided a product that is suitable for the baking trade which is in staple form. This is accomplished through the use of calcium sulphate and starch, preferably cornstarch. The calcium sulphate and powdered starch stabilize the calcium acid lactate and reduce its hygroscopic properties so that it will remain in powdered form.

More especially the invention is particularly applicable for use in connection with hard fat particles in the art of baking, as disclosed in my co-pending application Serial No. 517,110, filed January 5, 1944, now abandoned, wherein it is proposed to use discrete hard fat particles of fine mesh in conjunction with vegetable or animal shortenings of low melting point, whereby the hard fat particles and the low melting point shortening may combine in the mix to raise the softening point of the normal shortening material and thereby greatly improve the texture of the bread. These hard fat particles are preferably formed by freezing and pulverizing hard fat in a hammer mill and subsequently screening them to size. Upon returning to normal temperature, the hard fat particles have a tendency to agglomerate. The material of the present invention may be used to coat the fine particles of hard fat and prevent them from agglomerating. At the same time, as hereinafter more fully pointed out, the calcium acid lactate, being readily soluble in water, facilitates the distribution of the hard fat particles through the mix and the subsequent exposure of such hard fat particles to the soft shortening to enable the shortening and hard fat to combine.

The calcium acid lactate, stabilized with calcium sulphate and cornstarch not only serves to effectively prevent the hard fat particles from agglomerating, but the calcium acid lactate has the function of increasing the solubility of calcium sulphate so that the calcium sulphate is more effectively used as a yeast food. As pointed out in my said co-pending application Serial No. 599,119, the calcium acid lactate is itself a valuable ingredient in improving the commercial baking of bread, and has a synergistic action with other yeast foods.

In the mixture of calcium acid lactate, calcium sulphate and starch, it is preferred to have 60 parts by weight of calcium acid lactate, 15 parts by weight of calcium sulphate and 25 parts by weight of powdered starch. These proportions are not rigid, however, nor is it obligatory to use cornstarch since other starches would give comparable results.

The calcium acid lactate is obtained by reacting lactic acid with calcium carbonate. Since it is extremely difficult to obtain 100 per cent lactic acid, it is preferred to use either 85 per cent lactic acid or a 50 per cent lactic acid. These are employed approximately on the basis of 270 parts by weight of pure lactic acid of an edible grade of purity together with 100 parts by weight of pure calcium carbonate. These proportional parts are based on pure lactic acid and pure calcium carbonate. Since there are no commercially pure lactic acids a larger proportion of weaker lactic acids must be used based on percentage of purity. The calcium carbonate and lactic acid are mixed with heat and stirring, carbon dioxide and water being produced in the reaction.

During the reaction the calcium sulphate and starch are added directly into the reacting mass, while continuing the stirring. The resulting mass of material then is dehydrated either in the open or under vacuum until it contains less than three per cent of moisture. The material then is suitably comminuted in a hammer mill or otherwise, to a fineness of 200-mesh, or finer.

The resulting finely comminuted material is fluffy in character and has a high bulk factor. These properties make the calcium acid lactate composition desirable as a conditioner for particles of hard fat used as shortening for the bread. This fat is frozen and pulverized in a hammer mill or the like, producing coarse and fine particles which are separated by air classifying or screening, the calcium acid lactate composition being injected during the classifying before the fine fat particles settle, so that such fine particles are coated by the calcium acid lactate composition. The fine fat particles may be, and preferably are, of the order of 200-mesh and finer. Such coating prevents the fat particles from agglomerating and, being water-soluble except for the starch content, the calcium acid lactate composition assists the distribution of the fat through the dough. This property is a distinguishing property in favor of the calcium acid lactate composition over other materials, such as calcium stearate, which I have previously employed, but calcium stearate has no beneficial effects on the dough and it repels water; also, calcium acid lactate noticeably improves the action of yeast foods. By a hard fat I refer primarily to a completely hydrogenated fat having a melting point in the range of 130° F. to 160° F.

The amount of the compound of the present invention employed in baking is sufficient to provide actual calcium lactate in an amount between $\frac{1}{8}$ and $\frac{1}{4}$ of one per cent of total weight of the flour, the optimum amount being about three ounces of actual calcium acid lactate for each 100 pounds of flour. Obviously, calcium hydroxide may be employed instead of calcium carbonate as the reaction material for the lactic acid.

While normal calcium lactate has been used in yeast foods, it is no more effective than is calcium sulphate alone and is more expensive than calcium sulphate.

The term "bread" as used in the following claims is intended to cover any baked food products made with yeast.

In preparing the composition of the present invention, it will be understood that all of the constituents of the composition must be free from any ingredients deleterious to health.

I claim:

1. A preparation for incorporation in bread dough comprising hard fat particles of a mesh size of 200 and finer and having a melting point of 130° to 160° F., the particles being coated with a dry, fluffy, powder comprised of calcium acid lactate mixed with lesser volumes each of calcium sulfate and corn starch.

2. A preparation for use in baking bread comprising hard fat particles having a melting point in the range between about 130° F. and about 160° F. protected from agglomerating by calcium acid lactate adhered thereto and mixed therewith, the calcium acid lactate being stabilized with calcium sulfate and starch, the stabilized acid lactate being of a dry, fluffy character.

3. The method of preparing material for use in the baking of bread which comprises milling and plasticizing hard fat particles, contacting the fat particles during classification with calcium acid lactate stabilized with calcium sulfate and corn starch to render it non-hydroscopic, the stabilized calcium acid lactate being in the form of a dry fluffy powder that adheres to the fat particles.

FRANCIS FREDERICK HANSEN.

REFERENCES CITED

The following references are of record in the file of this patent:

UNITED STATES PATENTS

| Number | Name | Date |
|---|---|---|
| 1,158,933 | Kohman | Nov. 2, 1915 |
| 1,167,133 | Tierney | Jan. 4, 1916 |
| 1,210,940 | Holbrook | Jan. 2, 1917 |
| 1,265,369 | Peter | May 7, 1918 |
| 1,282,868 | Kohman | Oct. 29, 1918 |
| 1,286,904 | Atkinson | Dec. 10, 1918 |
| 1,427,979 | Stokes | Sept. 5, 1922 |
| 1,500,545 | Buffington | July 8, 1924 |
| 1,559,330 | Lowy | Oct. 27, 1925 |
| 1,589,311 | Hewitt | June 15, 1926 |
| 2,067,912 | Frey | Jan. 19, 1937 |

FOREIGN PATENTS

| Number | Country | Date |
|---|---|---|
| 232,284 | Great Britain | of 1923 |